(12) United States Patent
Hsieh

(10) Patent No.: US 8,458,372 B2
(45) Date of Patent: Jun. 4, 2013

(54) MASTER-SLAVE DEVICE COMMUNICATION SYSTEM BASED ON CURRENT

(75) Inventor: Ming-Chih Hsieh, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 530 days.

(21) Appl. No.: 12/723,690

(22) Filed: Mar. 15, 2010

(65) Prior Publication Data

US 2011/0197001 A1  Aug. 11, 2011

(51) Int. Cl.
*G06F 3/00* (2006.01)

(52) U.S. Cl.
USPC .............................................. 710/9; 710/104

(58) Field of Classification Search
USPC ...................... 710/9, 104, 300–302
See application file for complete search history.

(56) References Cited

U.S. PATENT DOCUMENTS

| 7,092,769 | B2* | 8/2006 | Iwamoto | 700/20 |
| 8,122,159 | B2* | 2/2012 | Monreal | 710/9 |
| 8,250,269 | B2* | 8/2012 | Hsieh | 710/104 |
| 2005/0132109 | A1* | 6/2005 | Steger | 710/104 |
| 2006/0079972 | A1* | 4/2006 | Simonazzi | 710/104 |
| 2010/0121534 | A1* | 5/2010 | Tanaka | 701/45 |

* cited by examiner

*Primary Examiner* — Nimesh G Patel
(74) *Attorney, Agent, or Firm* — Altis Law Group, Inc.

(57) ABSTRACT

A master-slave communication system includes a master device, a plurality of slave devices, and a bus providing communication channels therebetween. The master device includes a first micro control unit (MCU), a first power supply module, and an address setting module. Each slave device includes a second MCU and a second power supply module connected to the first power supply module through the address setting module. The address setting module detects a current output from the first power supply module, and outputs an ID address setting signal which is directly proportional with the current to the first MCU and the second MCU of a new slave device, the second MCU of the new slave device sets an ID address according to the ID address setting signal, the first MCU records the ID address as the ID address of the new slave device according to the ID address setting signal.

7 Claims, 2 Drawing Sheets

MASTER-SLAVE DEVICE COMMUNICATION SYSTEM BASED ON CURRENT

BACKGROUND

1. Technical Field

The present invention relates to communication systems, and particularly, to a communication system with a master device and a plurality of slave devices.

2. Description of Related Art

Master devices transmit data to slave devices by using ID addresses of the slave devices. Slave devices receive data correspondingly and transmit response data to the master devices.

In early control systems, the process of setting ID addresses is achieved through the use of two rotary address switches set using a decimal format. A control system can include up to several thousand slave devices, setting the addresses of the slave devices is time consuming, and the possibility of mistakes is increased.

DETAILED DESCRIPTION

Figure 1:
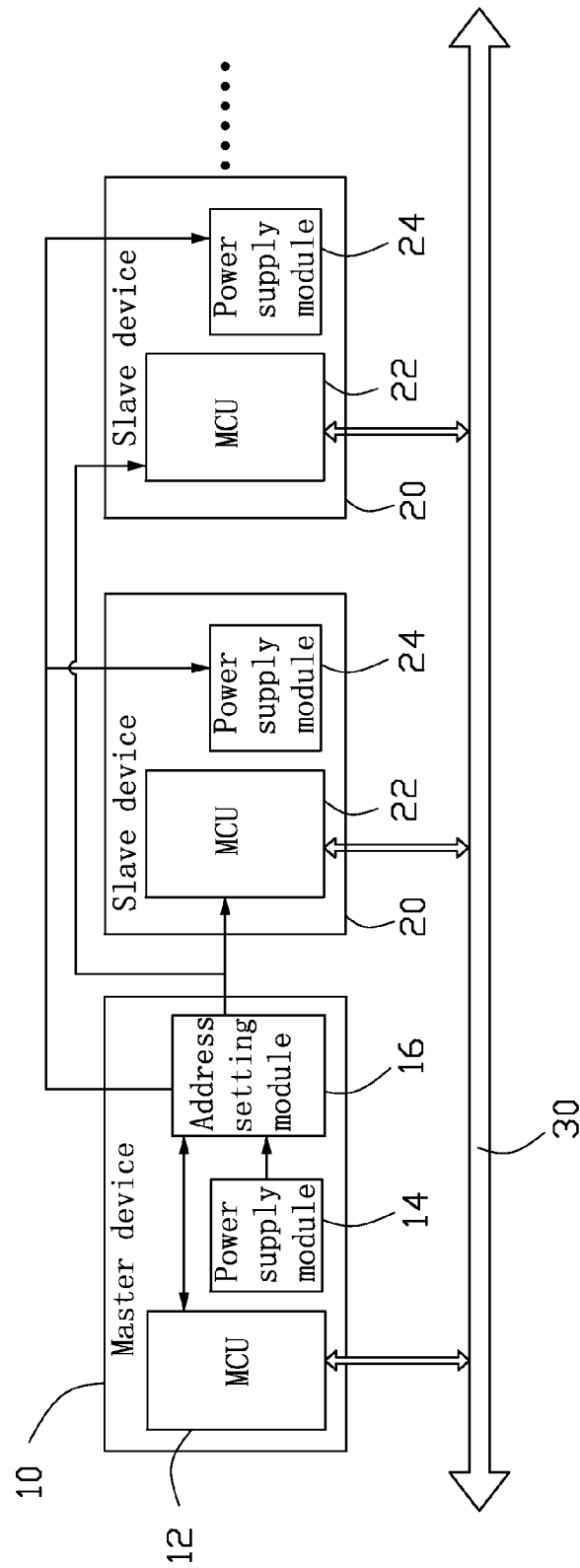
FIG. 1 is a block diagram of an exemplary embodiment of a communication system including an address setting module.

Referring to FIG. 1, an embodiment of a communication system includes a master device 10, such as a central processor unit, a plurality of slave devices 20, and a bus 30 providing communication channels between the master device 10 and the slave devices 20.

The master device 10 includes a micro control unit (MCU) 12, a power supply module 14, and an address setting module 16. Each slave device 20 includes an MCU 22 and a power supply module 24. The MCU 12 of the master device 10 is connected to the MCU 20 of each slave device 20 through the bus 30, to communicate with the slave devices 20.

The power supply module 14 of the master device 10 is connected to the power supply module 24 of each slave device 20 through the address setting module 16. The address setting module 16 detects a current output from the power supply module 14, and outputs an identification (ID) address setting signal to the MCU 12 of the master device 10 and the MCU 22 of a slave device 20 which is newly connected to the bus 30 (also called new slave device). The MCU 22 of the new slave device 20 sets an ID address according to the ID address setting signal. The MCU 12 of the master device 10 records the ID address as the ID address of the new slave device 20 according to the ID address setting signal. The MCU 12 also determines whether the ID address setting signal is greater than a predetermined value, namely whether the current output from the power supply module 14 is greater than a predetermined value, and outputs a stop signal to the address setting module 16 to stop the power supply module 14 supplying power to the slave devices 20.

Figure 2:
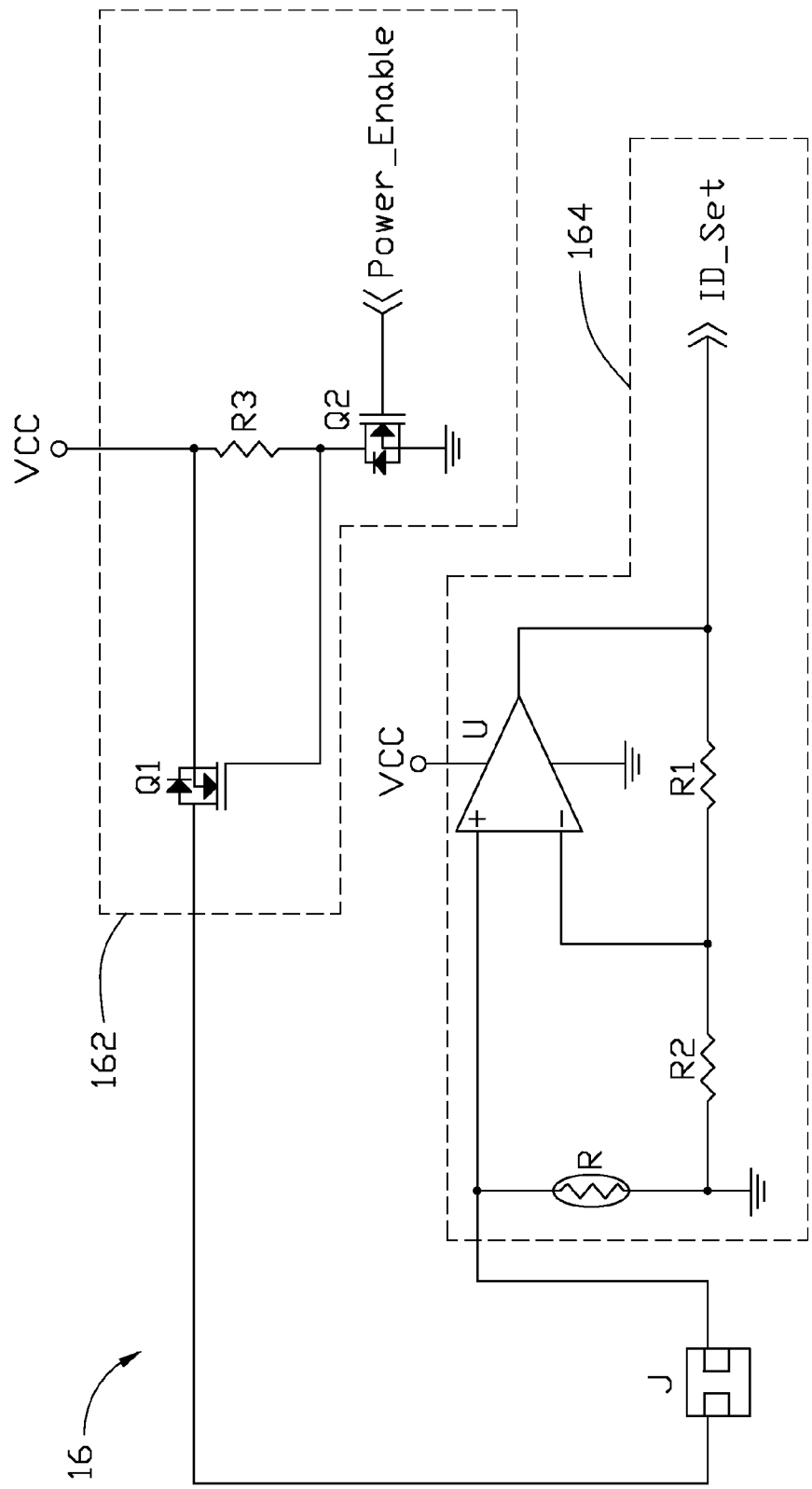
FIG. 2 is a circuit diagram of the address setting module of FIG. 1.

Referring to FIG. 2, the address setting module 16 includes a power receiving terminal VCC, a switch control unit 162, a power connector J connected to the power supply module 24 of each slave device 20, and a current detecting unit 164. The switch control unit 162 includes a first electrical switch such as a field-effect transistor (FET) Q1, a second electrical switch such as an FET Q2, a resistor R3, and a power control terminal Power_Enable. The current detecting unit 164 includes a shunt resistor R, an amplifier U, two resistors R1-R2, and an ID address setting signal output terminal ID_Set.

The power receiving terminal VCC receives voltage signals from the power supply module 14, and connected to a source of the FET Q1, and connected to a drain of the FET Q2 and a gate of the FET Q1 through the resistor R3. A source of the FET Q2 is grounded. A gate of the FET Q2 is connected to the power control terminal Power_Enable. A drain of the FET Q1 is connected to a first terminal of the power connector J. A second terminal of the power connector J is connected to a non-inverting terminal of the amplifier U and grounded through the shunt resistor R. An inverting terminal of the amplifier U is grounded through the resistor R2, and connected to an output terminal of the amplifier U and the ID address setting signal output terminal ID_Set through the resistor R1. The power control terminal Power_Enable is connected to the MCU 12 of the master device 10, to receive the stop signal. The ID address setting signal outputs terminal ID_Set outputs the ID address setting signal to the MCU 12 of the master device 10 and the MCU 22 of the slave device 20. In other embodiments, the amplifier U and the resistors R1 and R2 can be omitted for reducing costs, a node between the connector J and the shunt resistor R is connected to the ID address setting signal outputs terminal ID_Set.

In use, before the master device 10 communicates with a slave device 20, the MCU 12 outputs a low voltage level signal, may be 0 volt (V), to the power control terminal Power_Enable. The FET Q2 is turned off, and the FET Q1 is turned on. When a first slave device 20 is connected to the bus 30, the power supply module 24 of the first slave device 20 receives a voltage signal from the power supply module 14 through the power connector J. At the same time, a current I1 flows through the shunt resistor R and the power connector J, a voltage across the shunt resistor R is amplified by the amplifier U (the gain of the amplifier U can be adjusted by changing the resistances the resistors R1 and R2), and the amplifier U outputs a voltage signal U1 (namely the ID address setting signal) which is directly proportional with the current I1. The voltage signal U1 is transferred to the MCU 12 of the master device 10 and the MCU 22 of the first slave device 20 through the ID address setting signal output terminal ID_Set. The MCU 12 of the master device 10 and the MCU 22 of the first slave device 20 converts the voltage signal U1 to a digital signal D1, and defines the digital signal D1 as the ID address of the first slave device 20. The ID address of the first slave device 20 is changeless until the first slave device 20 is disconnected from the bus 30.

When a second slave device 20 is connected to the bus 30, the power supply modules 24 of the first and second slave devices 20 respectively receive voltage signals from the power supply module 14 through the power connector J. At the same time, a current I2 flows through the shunt resistor R and the power connector J, and the current I2 is greater than I1. A voltage across the shunt resistor R is amplified by the amplifier U, and the amplifier U outputs a voltage signal U2 which is directly proportional with the current I2. The voltage signal U2 is transferred to the MCU 12 of the master device 10 and the MCU 22 of the second slave device 20 through the ID address setting signal output terminal ID_Set. The MCU 12 of the master device 10 and the MCU 22 of the second slave device 20 converts the voltage signal U2 to a digital signal D2, and defines the digital signal D2 as the ID address of the second slave device 20. The ID address of the second slave device 20 is different from the ID address of the second slave device 20 because the current I2 is different from the current I1.

In a similar way, the next slave device 20 connected to the bus 30 are set different ID addresses, together with the first and second slave devices 20, which cannot influence the communication between the master device 10 and the slave devices 20, and this setting mode is convenient.

Furthermore, if the voltage signal output from the amplifier U1 is greater than a predetermined value (namely the current through the shunt resistor R is greater than a predetermined value, such as a rating current), the MCU 12 of the master device 10 output a high voltage level signal, may be 5V, to the power control terminal Power_Enable. The FET Q2 is turned on, and the FET Q1 is turned off. Therefore, a power transferring channel between the power supply module 14 of the master device 10 and the power supply module 24 of the slave device 20 is cut off, and the slave device 20 receive no power. In other embodiments, to reduce costs, the FETs Q1 and Q2, the resistor R3, and the power control terminal Power_Enable can be omitted, the power receiving terminal VCC is connected to the power connector J directly.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A master-slave communication system comprising:
   a master device comprising a first micro control unit (MCU), a first power supply module, and an address setting module;
   a plurality of slave devices each comprising a second MCU and a second power supply module connected to the first power supply module through the address setting module; and
   a bus providing communication channels between the master and the plurality of slave devices;
   wherein the address setting module detects a current output from the first power supply module, and outputs an ID address setting signal which is directly proportional with the current to the first MCU and the second MCU of a new slave device which is newly connected to the bus, the second MCU of the new slave device sets an ID address according to the ID address setting signal, the first MCU records the ID address as the ID address of the new slave device according to the ID address setting signal.

2. The master-slave communication system of claim 1, wherein the ID address setting module comprises a power receiving terminal for receiving voltage signals from the first power supply module, a power connector connected to the second power supply modules, and a current detecting unit, the power receiving terminal is connected to the current detecting unit through the power connector, the current detecting unit is operable to detect current through the power connector and output the ID address setting signal according to the current.

3. The master-slave communication system of claim 2, wherein the current detecting unit comprising a shunt resistor and an ID address setting signal output terminal, the power receiving terminal is connected to a first terminal of the power connector, a second terminal of the power connector is grounded through the shunt resistor, a node between the power connector and the shunt resistor is operable to output the ID address setting signal.

4. The master-slave communication system of claim 2, wherein the current detecting unit comprises a shunt resistor, an amplifier, first and second resistors, and an ID address setting signal output terminal, the power receiving terminal is connected to a first terminal of the power connector, a second terminal of the power connector is grounded through the shunt resistor, a node between the power connector and the shunt resistor is connected to a non-inverting terminal of the amplifier, an inverting terminal of the amplifier is grounded through the first resistor and connected to an output terminal of the amplifier through the second resistor and operable to output the ID address setting signal.

5. The master-slave communication system of claim 2, wherein the address setting module further comprises a switch control unit comprising a power control terminal, first and second electrical switches, the first electrical switch is connected between the power receiving terminal and the power connector, the second electrical switch is connected between the first electrical switch and the power control terminal, the power control terminal receives a control signal from the first MCU and cut off the connection between the power receiving terminal and the power connector in response to the current being greater than a predetermined value.

6. The master-slave communication system of claim 5, wherein the first and second electrical switches are two field-effect transistors (FETs), a source of the first electrical switch is connected to the power receiving terminal, a drain of the first electrical switch is connected to the power connector, a gate of the first electrical switch is connected to a drain of the second electrical switch, the drain of the second electrical switch is connected to the power receiving terminal via a resistor, a source of the second electrical switch is grounded, a gate of the second electrical switch is connected to the power control terminal.

7. The master-slave communication system of claim 1, wherein the ID address setting module further comprises a switch control unit, the switch control unit is operable to cut off the connection between the first power supply module and the second power supply modules in response to the current being greater than a predetermined value.

* * * * *